G. AND P. TOWNILL.
STEEL GRAIN CAR DOOR.
APPLICATION FILED MAY 9, 1918.

1,328,214.

Patented Jan. 13, 1920.
2 SHEETS—SHEET 1.

Witnesses

Inventors
G. Townill
P. Townill
By
their Attorneys

G. AND P. TOWNILL.
STEEL GRAIN CAR DOOR.
APPLICATION FILED MAY 9, 1918.
1,328,214.
Patented Jan. 13, 1920.
2 SHEETS—SHEET 2.
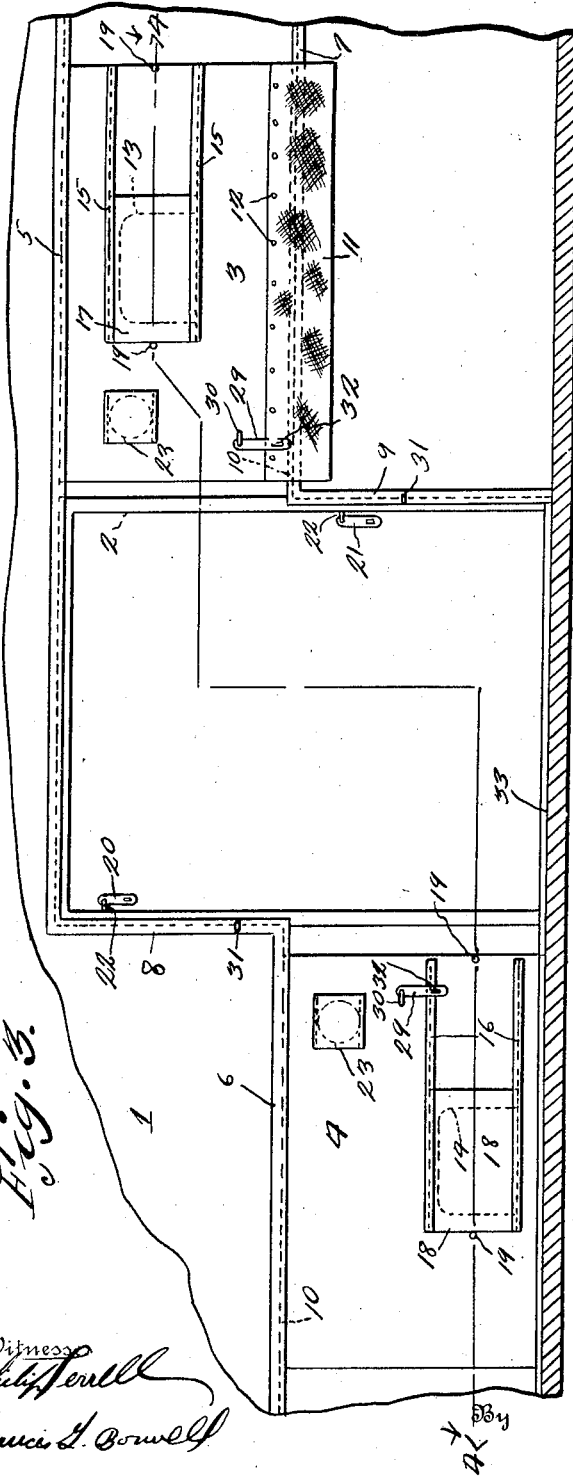
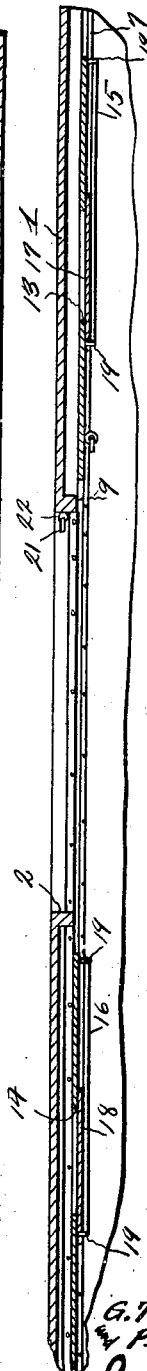

UNITED STATES PATENT OFFICE.

GEORGE TOWNILL AND PETER TOWNILL, OF PLAINFIELD, ILLINOIS.

STEEL-GRAIN-CAR DOOR.

1,328,214.  Specification of Letters Patent.  Patented Jan. 13, 1920.

Application filed May 9, 1918. Serial No. 233,427.

*To all whom it may concern:*

Be it known that we, GEORGE TOWNILL and PETER TOWNILL, citizens of the United States, residing at Plainfield, in the county of Will, State of Illinois, have invented a new and useful Steel-Grain-Car Door; and we do hereby declare the following to be a full, clear, and exact description of the invention, such as will enable others skilled in the art to which it appertains to make and use the same.

This invention relates to an improved steel grain car door, and one of the objects of the invention is to provide, a simple, efficient and practical device of this kind, in which improved features of construction exist.

A further object of the invention is the provision of a sectional grain car door, said sections being movable in guides, one in one direction, and the other in the opposite direction, said sections having a fiber covered overlapping joint.

A further object of the invention is to provide the sections with closure controlled openings, in combination with guides for said closures.

A further object of the invention is to provide improved locking means for the sections of the grain car door.

In practical fields the details of construction may necessitate alterations falling within the scope of what is claimed.

The invention comprises further features and combination of parts as hereinafter set forth shown in the drawings and claimed.

In the drawings:—

Fig. 3 is a sectional view through a portion of the steel grain car, showing the sections of the door open, viewing the same from within the car.

Fig. 4 is a sectional view on line 4—4 of Fig. 3.

Fig. 6 is a detail sectional view on line 6—6 of Fig. 1, showing the locking means of one of the sections.

Figures 1, 2, 5:
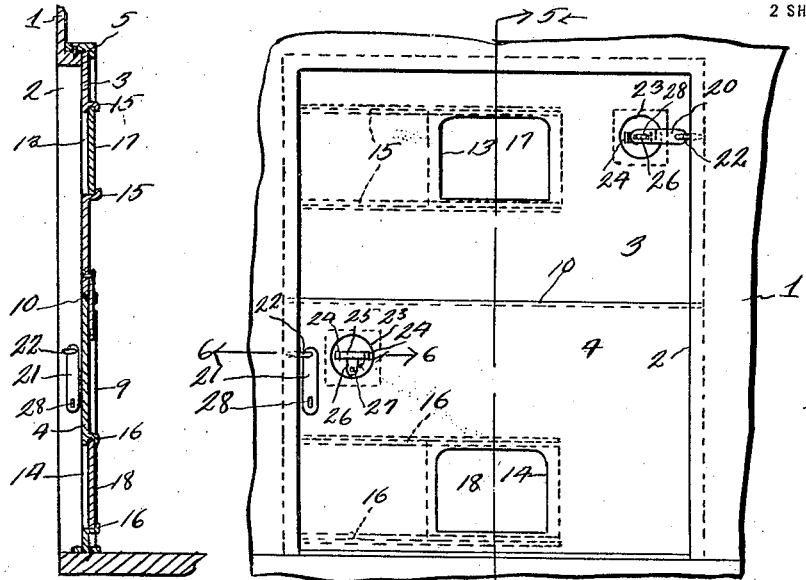
Figure 1 is a view in side elevation of a portion of a steel grain car, only sufficient to show the door opening, showing the grain car door applied.
Fig. 2 is an inside view of the grain car door, viewing the same from within the car.
Fig. 5 is a sectional view on line 5—5 of Fig. 1.

Referring more especially to the drawings 1 designates a portion of the steel grain car the side of which is provided with a conventional form of door opening 2 and the door for closing this opening comprising the upper and lower sections 3 and 4, which are also constructed of any suitable metal preferably steel. Guide rails 5, 6 and 7 are provided, in which the sections 3 and 4 are slidably mounted. In fact the guide rails 5 and 6 consist of a continuous angular flange carried by the inner face of the side of the steel car. In other words the rail 5 merges into the rail 6 through the medium of the vertical connecting part 8, which is also angular in cross section and constitutes an abutment for the section 3 of the door. The guide rail 7 is parallel to the guide rail 5, and has at one end a right angled disposed vertical part 9 which is also angular in cross section and constitutes an abutment jamb for the door section 4. The two abutment jambs 8 and 9 are in parallelism but diagonally opposed, since one section of the door is movable slidably in one direction and the other section in the opposite direction. When the two sections are closed, the section 3 rests upon the section 4, and the adjacent edges of the sections have overlapping flanges 10, thereby providing a secured joint between the two sections. A flexible piece of any suitable fiber, preferably leather or the like 11 is riveted or otherwise secured at 12 to the section 3 of the door, whereby the flexible piece may overlie the lapping flanges 10 of the joint between the two door sections. This flexible piece is carried on the inner face of the door section 3. The upper and lower sections are provided with openings 13 and 14, adjacent the upper and lower edges of which are guide rails 15 and 16 angular in cross section, for the reception of the sliding closures 17 and 18.

Abutment pins 19 are arranged on the door sections and so spaced as to limit the closures 17 and 18 in their movements in either direction. The door sections 3 and 4 are each provided with locking means to be engaged by plates 20 and 21 at diagonal opposite portions of the jamb of the door opening. These plates 20 and 21 are carried in eyes 22 which are located on the jamb of the door opening. The locking devices for the door sections comprise depressions 23 in the outer faces of the door sections. These depressions are formed as shown clearly in Fig. 6. Projecting from the flat wall of each depression are ears 24, in bearings of which the pintles of the rocking member 25 are mounted. This rocking member has an ear 26 provided with an opening 27. When the rocking member 25 is moved so that the ear 27 extends laterally, said ear may pass through the slot 28 in the plate 21, after which the usual shackle of a pad-lock may be passed through the opening 27, to hold the door section closed and locked. The inner face of one end of each section has a slotted plate 29 connected to the eye 30. The jamb abutments 8 and 9 carry eyes 31. When the door sections are closed the eyes 31 may pass through the slots 32 of the plates 29, after which the shackles of the usual padlocks (not shown) may engage the eyes 31, consequently locking the doors on the inside of the car.

The invention having been set forth what is claimed as new and useful is:—

In a grain car door, formed in two sections, said sections being superimposed and adapted to be moved horizontally in opposite directions, a flanged runway to one side of the door opening for the reception of the upper section and a flanged abutment at the opposite side of the door opening as limiting means for said upper section a flanged runway at the opposite side of the door opening for the reception of the lower section of the door after the upper section has been moved into its runway, a flanged abutment at the opposite side of the runway for the lower section, said flanged abutments preventing and maintaining the sections in super-imposed engagement with each other, and a pliable joint closure between the engaging edges of the superimposed sections, said pliable joint closure comprising a strip of material riveted adjacent the lower edge of the upper section and spaced therefrom so that when the upper section is moved into its runway the lower flanged member of the runway will pass under said joint closure, said joint closure forming means for preventing fine material or grain from passing between the sections.

In testimony whereof we have signed our names to this specification in the presence of two subscribing witnesses.

GEORGE TOWNILL.
PETER TOWNILL.

Witnesses:
MERTON H. HORTON,
LESTER S. HAMLIN.